United States Patent [19]

Cope et al.

[11] 4,207,947
[45] Jun. 17, 1980

[54] MEANS FOR INCREASING TRACTION IN RACEHORSE HORSESHOES

[75] Inventors: Rick R. Cope, Oklahoma City, Okla.; Delbert L. Rosengrants, Victorville, Calif.

[73] Assignees: Jojan, Inc.; David A. Necco, both of Oklahoma City, Okla.

[21] Appl. No.: 828,048

[22] Filed: Aug. 26, 1977

[51] Int. Cl.² .......................... A01L 1/04; A01L 7/04
[52] U.S. Cl. ........................................... 168/29; 168/4
[58] Field of Search ................ 168/4, 11, 12, 16, 17, 168/21, 23, 29, 31, 33, 36, 37

[56] References Cited

U.S. PATENT DOCUMENTS

| | | | |
|---|---|---|---|
| 809,553 | 1/1906 | Campbell et al. | 168/29 |
| 903,830 | 11/1908 | Berg | 168/31 |
| 1,035,969 | 8/1912 | Kiefer | 168/29 |
| 1,447,153 | 2/1923 | Sala | 168/29 |
| 1,468,196 | 9/1923 | Curzon | 168/11 |

Primary Examiner—Russell R. Kinsey
Assistant Examiner—Robert P. Swiatek
Attorney, Agent, or Firm—Dunlap, Codding & McCarthy

[57] ABSTRACT

An insert for use with a racehorse shoe having a front end calk, the insert being a plate able to be nailed to the horse's hoof between the shoe and the hoof, the plate having a forward curved edge to generally conform to the front edge of the hoof, area portions of the plate being able to receive the nails securing the shoe to the hoof, and a second rearward calk on the plate having a downwardly directed configuration similar to the front calk on the shoe. In the combination of a racehorse shoe on a racehorse hoof including, a shoe having a front first calk, the shoe being nailed to the hoof, and a second rearward calk secured to the shoe and to the hoof, the second calk being centrally positioned transversely within the shoe and being adjacent the forward half of the shoe.

13 Claims, 13 Drawing Figures

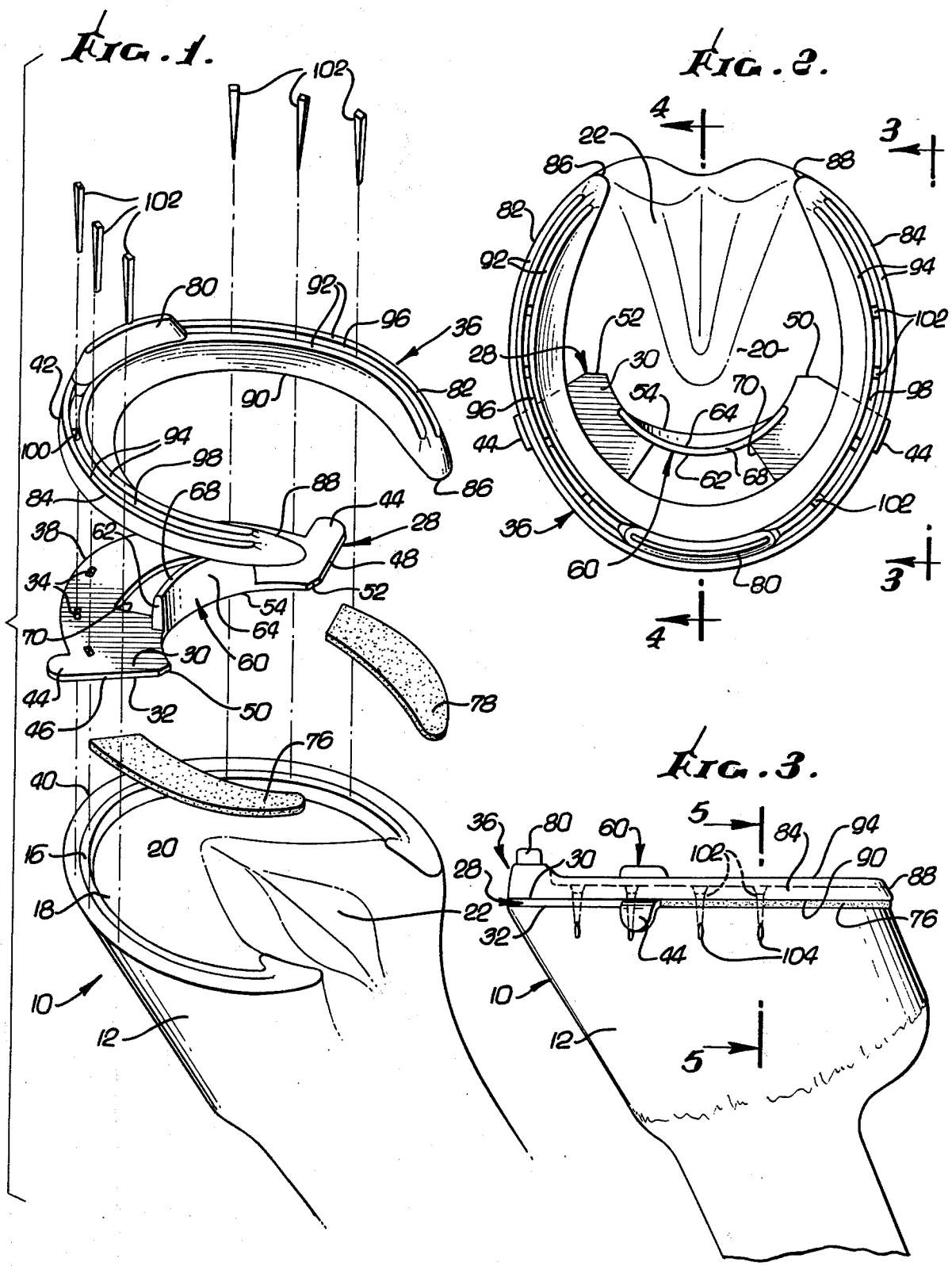

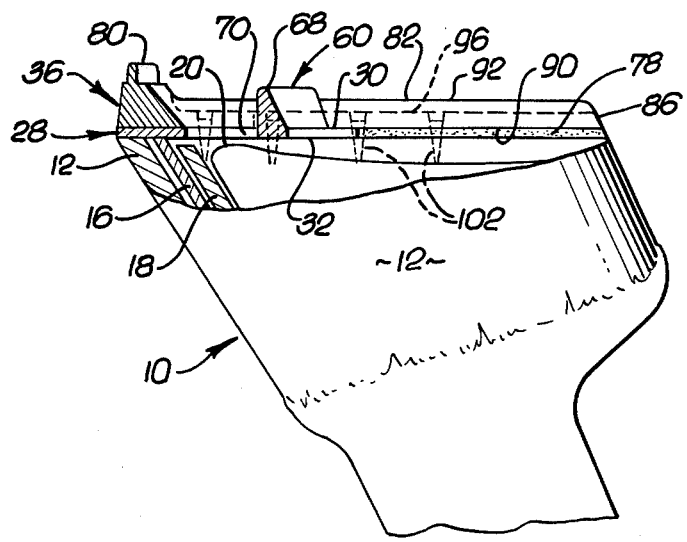
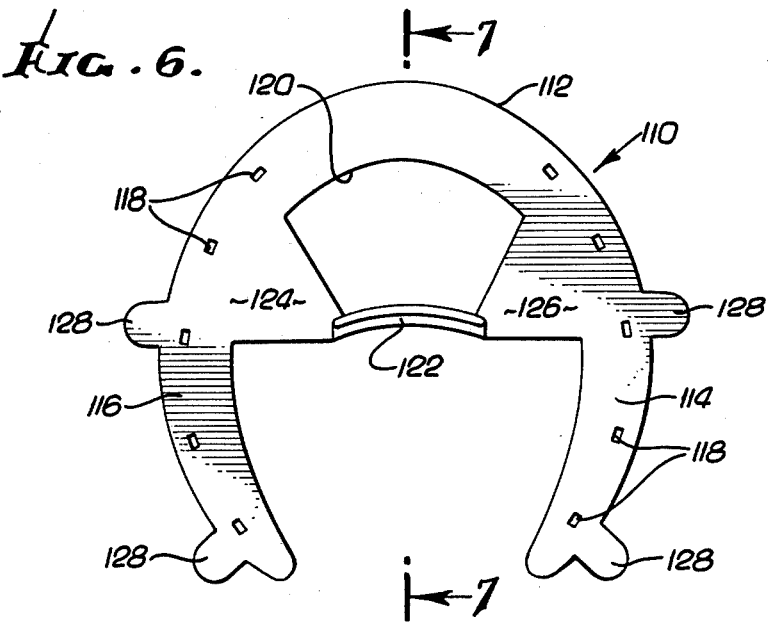
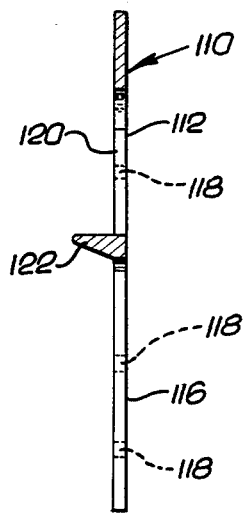
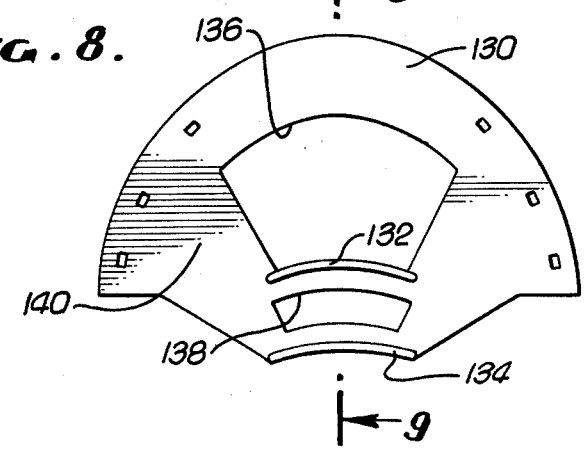
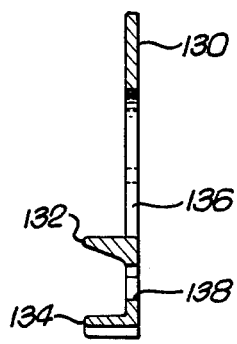

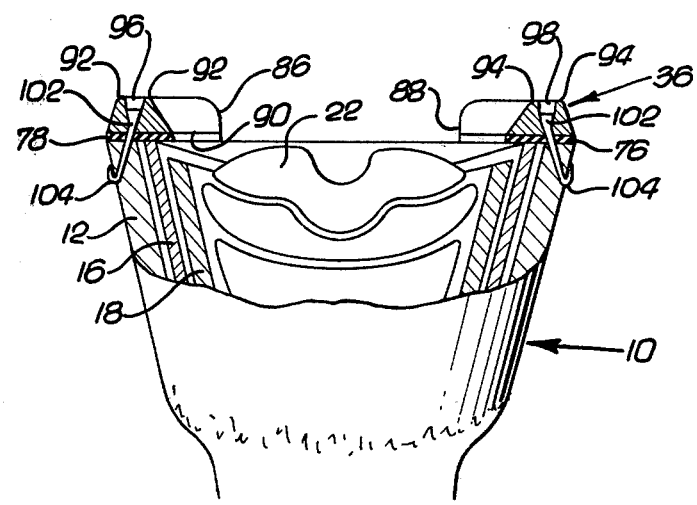
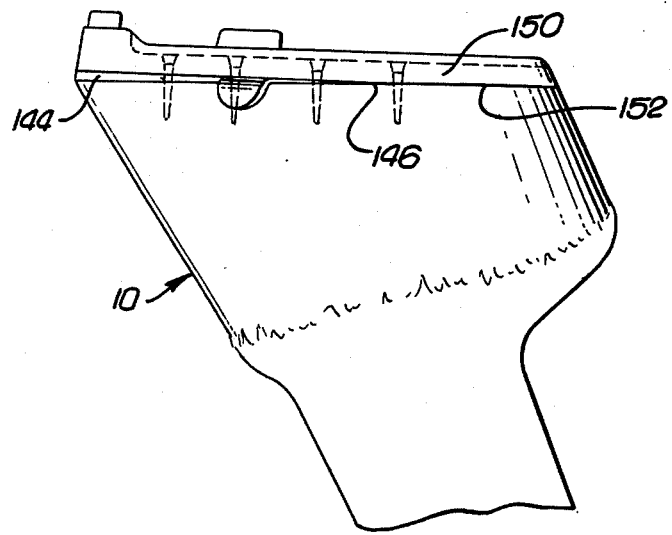
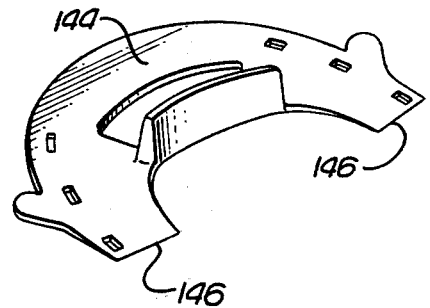
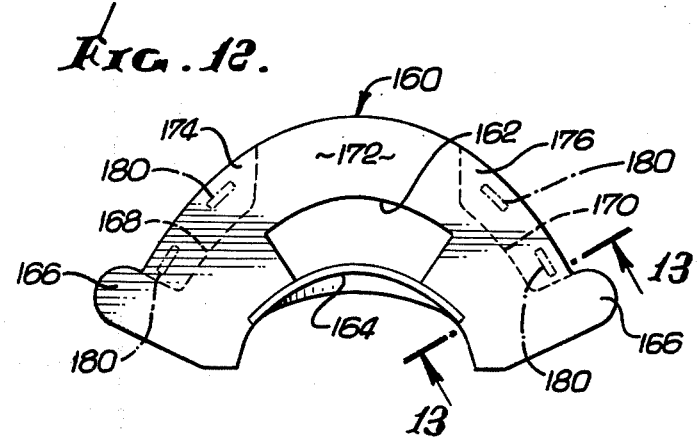
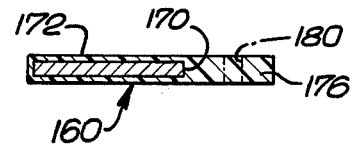

MEANS FOR INCREASING TRACTION IN RACEHORSE HORSESHOES

BACKGROUND OF THE INVENTION

Typical racehorse shoes are lightweight, made of a minimum of material, and have one calk at the forward end. This calk provides the primary means by which the horse achieves traction in the turf. One of the problems with such shoes has been that they provide a minimum means for achieving such traction.

Another problem with the minimum area and weight-type racehorse shoe is that it fails to protect the area of the horny sole of the hoof.

SUMMARY OF THE INVENTION

According to the present invention, it has been found that the addition of a second calk provided to be used with the prior art shoe substantially increases the speed of the horse by the additional traction obtained, and also is positioned, along with its connecting means, to protect the horny sole. The second calk may be made of metal or a hard plastic, for example.

It has been found that a second calk can be added to a conventional shoe by a plate insert that is secured to the hoof between the shoe and the hoof. Racehorse shoes are manufactured in about five or more sizes and the inserts according to the invention are made to correspond to the various sizes.

In many cases the shoe must be heated and shaped substantially to fit an individual hoof and, where this is necessary, it has been found that the second calk can be best added by means of an inserted plate to which the calk is attached.

In situations where it is not necessary to change the shape of the shoe significantly for an individual hoof, it is possible to make the shoe, the plate and the second calk integral.

Accordingly, it is an object of the invention to provide an improved means for increasing traction in racehorse shoes.

It is another object of the invention to provide a plate insert carrying a second calk, to be positioned between the hoof and the shoe and secured to the hoof with some or all of the nails that secure the shoe to the hoof.

It is still another object of the invention to provide an improved racehorse shoe having one or more additional calks to increase the traction of the shoe in the turf.

It is a further object of the invention to provide means for use in combination with a racehorse shoe which increases the traction obtainable in the turf, and, in addition, protects the horny sole of the hoof.

It is a still further object of the invention to provide inserts, as described above, which can be nailed to the hoof with shoe nails without the necessity of nail holes in the insert that would have to be aligned with the nail holes in the shoe.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is an exploded view of the invention, illustrating its relation to the horse's hoof;

FIG. 2 is a plan view of the invention and shoe secured to the hoof;

FIG. 3 is a side view of the shoe and horse's hoof, taken along the lines 3—3 in FIG. 2;

FIG. 4 is a partially cross-sectional view, taken along the lines 4—4 in FIG. 2;

FIG. 5 is a partially cross-sectional view, taken along the lines 5—5 in FIG. 3;

FIG. 6 is a plan view of another embodiment of the invention;

FIG. 7 is an end view, taken along the lines 7—7 in FIG. 6;

FIG. 8 is a plan view illustrating a third embodiment of the invention;

FIG. 9 is a cross-sectional view, taken along the lines 9—9 in FIG. 8;

FIG. 10 is a view of a shod hoof, illustrating still another embodiment of the invention;

FIG. 11 is a perspective view of the embodiment illustrated in FIG. 10;

FIG. 12 is a plan view of an embodiment of an invention in which nail holes are not required; and FIG. 13 is a cross-sectional view, taken along the lines 13—13 in FIG. 12.

DESCRIPTION OF THE PREFERRED EMBODIMENTS

Referring again to the drawings, there is shown in FIGS. 1-5 details of a horse's hoof and one embodiment of the invention. The hoof 10 is comprised of a horny wall 12, and inwardly thereof, a white line 16 and lateral cartilages 18. Indented at the cartilages and forming a substantial portion of the bottom of the hoof is a horny sole 20, and centrally to the rear of the sole is a frog 22. The horny wall is visible from the front and sides of a standing horse, and forms the marginal edge on the bottom of the hoof into which the horseshoe nails are driven. Inwardly of the horny wall is the white line which is the bond of union between the sole and the wall. It is soft horn and indicates the amount of wall into which the shoer has to place the nail. The white line is not necessarily white in color, but it is essentially identified by variation of color and texture, and is bounded by the wall on the outside and the horny sole on the inside. The lateral cartilages terminate in the arch of the sole, as shown in FIG. 5.

The insert of the first embodiment, generally designated as 28, is shown in perspective in FIG. 1 and is formed of a flat plate having opposing parallel sides 30 and 32 through which extend nail holes 34 aligned with the nail holes in the racehorse shoe, generally designated as 36.

The plate 28 forms an approximate quadrant with respect to the hoof and the shoe and its outer curved edge 38 conforms to the forward outer edge 40 of the hoof and 42 of the shoe. Rearwardly on both sides of the edge 38 are clips 44 which are alignment aids and help secure the plate to the hoof. Rearwardly of the clips are inwardly directed straight edges 46 and 48 which terminate in short straight edges 50 and 52 from which extends a rearwardly facing concave edge surface 54.

Extending generally outwardly from the plate at the surface 54 is a transversely centered, rear or plate calk, generally designated as 60, having a leading convex front face 62 and a rearward concave face 64. The faces 62 and 64 terminate downwardly from the hoof in a curved edge 68 extending in a plane generally parallel to the plate 28. Forwardly of the calk is a cutaway area or lightening opening 70. Adapted to extend rearwardly and generally in abutment with the edges 46 and 48 are spacer pads 76 and 78, conforming to the hoof and the shoe.

The racehorse shoe 36 has a forward or toe calk 80 having substantially the same configuration as the calk 60. The toe calk extends downwardly from the toe edge 42 of the shoe. Rearwardly of the toe are the opposing shoe quarters 82 and 84, and the rear ends of the shoe are formed as heels 86 and 88. The shoe has a flat inner or upper surface 90 and rearwardly of the calk has rearwardly and downwardly extending edges 92, 94 spaced by nail grooves 96, 98 to which the nail holes 100 extend, and into which the nails 102 are driven to secure the shoe to the hoof. The nails also go through the holes 34 in the plate 28 so as to secure the plate between the shoe and the hoof. Because the plate is positioned forwardly on the hoof, only the forward three nails on each side extend through the nail holes 34 in the plate. As shown in FIG. 5, the nails are driven into the hoof wall 12 and through its outer side where they are bent downwardly at 104 to better hold the shoe on the hoof.

Racehorse shoes come in a number of sizes and the size closest to an individual hoof is selected. The plates 28 are made to match the shoe sizes and when the shoes are applied to the hoof there typically has to be some fitting which requires the shoe to be heated and bent to perfectly match the hoof. Similarly, some fitting may be required with the matching plates, and where this is required they can be filed or ground down to match the changed configuration of the shoe. After the shoe and plate are secured to the hoof, the tabs 44, as shown in FIG. 3, are bent upwardly and tightly fitted on the outer wall of the hoof.

In situations where the shoe fits the hoof without requiring substantial fitting changes, the second calk can be made integral with the shoe, connected thereto by plate portions which do not extend under the shoe.

Because the bottom of the hoof and the top of the shoe are flat, with a plate, such as 28, the spacers 76, 78 are employed rearwardly of the plate to prevent the shoe from bending or breaking at the end of the plate. These spacers may be relatively stiff elastomeric material or relatively stiff plastic foam.

As may be seen in FIGS. 2 and 3, portions of plate 28 extending inwardly of the shoe provide protection for the hoof, whereas without the plate there is no such protection. Similarly, the rear or second calk, being on the forward half of the hoof, on the plate also protects the hoof sole. The forward calk on the shoe extends substantially farther outwardly or downwardly from the shoe than the second calk 60. Thus, the greater bite into the turf is taken by the forward calk and a lesser bite is taken by the second calk. However, because the turf is quite deep and loose, the second calk is in position to achieve substantial traction, and the two calks together greatly improve the traction so as to permit the horse to substantially increase its speed.

A second embodiment of the invention is shown in FIGS. 6 and 7. Here the insert plate 110 has a forward end 112 similar to the plate 28, but also has rearward extensions 114 and 116 which conform to the shoe and has nail holes 118, aligned with those in the shoe. This embodiment has a lightening opening 120 and the second or rear calk 122, similar to the calk 60, forms a bridge across the end of the opening with plate portions 124 and 126 so that the calk is positioned about half way between the front and rear end of the hoof. The rear end portions 114 and 116 may have to be changed in configuration to precisely fit the hoof. On this structure there are four tabs 128 which are bent upwardly in the same manner as the tabs 44 so as to aid in holding the plate on the shoe. This embodiment eliminates the spacers 76 and 78, the rear portions 114 and 116 being positioned in contact with the lower portion of the hoof and the inner face of the shoe.

In FIGS. 8 and 9 the embodiment shown is an insert plate 130 having two calks 132 and 134 to provide three calks along with the calk on the shoe. This plate has two lightening holes 136 and 138 with some additional plate area 140 extending transversely between the calks.

With this embodiment the rearward calk 134 is adapted to be fitted approximately in the center of the shoe and hoof. The third calk is provided to aid the horse in achieving additional traction, which would be particularly desirable on a muddy track, for example.

In FIGS. 10 and 11, an insert plate 144 is tapered from the front edge to form substantial knife edges 146 at the rear ends. This embodiment is otherwise substantially the same as that shown in FIG. 1. It eliminates the need for the spacers 76 and 78 so that the shoe 150 has its inner surface 152 in a straight line on the plate continuing on the hoof.

With this embodiment the inner surface of the shoe 152 may be tapered slightly to make a better fit or can be, depending upon the hoof surface, nailed thereon so as to form the desired continuous straight line from one end of the hoof and shoe to the other.

In FIGS. 12 and 13 an insert plate 160 is formed having a lightening hole 162 and a calk 164. It also has tabs 166. The plate is made with cutaway portions 168 and 170 just forwardly of the tabs. The entire plate has a hard plastic coating 172 and the cutaway portions 170 are filled with the same plastic to replace the cutaway metal, having the plastic sections 174 and 176 bonded to the metal.

This embodiment eliminates the need for drilling nail holes in the plate and aligning them with the nail holes in the shoe. Here the nail holes 180 are shown in phantom outline in that they do not exist until the nails are driven through the plastic portions 174 and 176 when the shoe and plate are secured to the hoof.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims, wherein various portions have been separated for clarity of reading and not for emphasis.

We claim:

1. An insert for use with a racehorse shoe having a front end calk, comprising:
 a plate adapted to be nailed to the horse's hoof between the shoe and the hoof,
 said plate having a forward curved edge to
 area portions of said plate having means to permit nailing of the plate to the hoof with nails securing the shoe to the hoof, and turf engaging means extending downwardly from the plate and rearwardly of the front calk on the shoe.

2. The invention according to claim 1 in which:

said last means is a second calk having a downwardly directed configuration similar to the front calk on the shoe.

3. The invention according to claim 2 in which:

an opening is adapted to extend through the plate adjacent the forward end of the shoe and the second calk, and outer side portions extend laterally outwardly of the opening and the second calk.

4. The invention according to claim 3 in which:

peripheral outer edges of the plate, including the forward curved edge, generally form an approximate quadrant in plan with respect to the hoof, and approximate radially extending edges at a rear end of the plate terminate inwardly in a concave rear edge adjacent the second calk.

5. The invention according to claim 4 in which:

gripping and aligning tabs are adapted to extend upwardly onto the hoof extending from said peripheral outer edges adjacent said approximate radial edges.

6. The invention according to claim 3 including:

rearward side portions rearwardly of said outer side portions to conform to the rear portions of the shoe.

7. The invention according to claim 3 in which:

peripheral outer edges of the plate, including the forward curved edge, conform to the front portion of the shoe, generally transverse rear edges of the plate extend generally inwardly from the outer edges and terminate adjacent the second calk, said plate terminating rearwardly at a position underlying the forward half of the hoof and overlying the forward half of the shoe.

8. The invention according to claim 7 in which:

spacers are adapted to fit between the shoe and hoof rearwardly of the plate.

9. The invention according to claim 2 in which:

the front calk on the shoe is adapted to extend downwardly from the hoof farther than the second calk on the plate.

10. The invention according to claim 9 in which:

said calks have convex leading faces and concave rear faces terminating in a downwardly facing substantially flat edge parallel to the plate and curved as the faces.

11. The invention according to claim 2 including:

a third calk rearwardly of and similar to said second calk on said plate.

12. The invention according to claim 2 in which:

said plate is tapered rearwardly from the forward edge thereof forming approximate knife edges at its rear end.

13. The invention according to claim 2 in which:

said plate is metal and has substantially flat opposing sides, one of said sides being adapted to be in contact with said hoof and the other side being adapted to be in contact with said shoe, said flat sides and edges thereof being coated with a plastic material, said area portions being comprised entirely of said plastic.

* * * * *

UNITED STATES PATENT OFFICE
CERTIFICATE OF CORRECTION

Patent No. 4,207,947     Dated June 17, 1980

Inventor(s) Rick R. Cope, Delbert L. Rosengrants

It is certified that error appears in the above-identified patent and that said Letters Patent are hereby corrected as shown below:

In Column 4, line 65, the word "to" should be followed by the words --generally conform to the front edge of the hoof,--.

Signed and Sealed this

Seventh Day of October 1980

[SEAL]

Attest:

SIDNEY A. DIAMOND

Attesting Officer     Commissioner of Patents and Trademarks